2,695,900

TRIVINYL TRICHLOROBENZENE COMPOUNDS

Moushy Markarian and Sidney D. Ross, North Adams, and Mathew Nazzewski, Adams, Mass., assignors to Sprague Electric Company, North Adams, Mass., a corporation of Massachusetts No Drawing. Application September 25, 1951, Serial No. 248,286

6 Claims. (Cl. 260—87.5)

This invention relates to new polymerizable trivinyl aromatic compounds, and more specifically to monomers, polymers and copolymers of trivinyl trichlorobenzene. This application is a continuation in part of our copending application 727,736, filed February 10, 1947, now Patent No. 2,602,823.

The development of the divinyl tetrachlorobenzenes is described in the Markarian Patent No. 2,528,445. These compounds are solids at room temperature, are highly stable, and are valuable polymerization materials. A need exists for monomers possessing physical and electrical properties comparable to these substituted divinyl benzenes, but having a much higher functionality.

Also the need became apparent for a cross-linking compound of higher functionality and low dipole moment, the raw material for which could be made cheaply and simply by direct alkylation.

The starting material, 1,3,5 triethyl benzene, is symmetrical and has a sufficiently low dipole moment for high frequency applications. Of the diethyl benzenes which form the starting material for the commercial divinyl benzenes only the para isomer has the required low dipole moment. This isomer, however, is less readily available than 1,3,5 triethyl benzene.

It is an object of this invention to produce the trivinyl trichloroaromatic compounds which have the desirable properties indicated above. A further object of this invention is to produce resins having excellent solvent resistance which employ in their composition trivinyl trichloro benzene. These and other objects become apparent from this specification including the appended claims.

The new trivinyl benzene compounds of this invention are extremely advantageous in that they are solids at normal temperatures and in that they can be purified by crystallization. They have little tendency to polymerize or decompose when stored in the solid monomeric state for extended periods. They can be accurately adjusted as to cocentrations in systems in which they are to be copolymerized with other monomers. Because of their high chlorine content they are extremely desirable as flame retardants.

These trivinyl trichlorobenzenes may be readily prepared by the nuclear chlorination of triethylbenzene, followed by the side chain bromination of the resulting nuclearly substituted product so as to place an alpha bromine atom in each of the ethyl groups. This reaction and typical alpha-bromo ethyl substituted halogenated benzenes prodced thereby are shown in our parent case, bearing S. N. 727,736, filed on February 10, 1947. The desired trivinyl products may then be prepared from this intermediate by dehydrohalogenation with potassium hydroxide or sodium hydroxide in alcohol.

The preferred trivinyl trichlorobenzene formed in accordance with this invention is the symmetrical product formed from symmetrical triethyl benzene. It is to be understood, however, that any of the trivinyl tirchlorobenzene may be prepared by substantially the same processes as is used in the preparation of symmetrical product, the only variation being in the structure of the initial triethyl benzene starting material.

The trivinyl trichlorobenzene monomers can be homopolymerized to hard, non-flammable, infusible resins by the use of heat and/or an appropriate polymerization catalyst. Copolymers of these monomers having a wide variety of properties can be prepared by the same general methods. Where it is desired to obtain elastomeric polymers small proportions of these trivinyl monomers may be copolymerized with such conjugated dienes as isoprene; 1,3-dimethylbutadiene-1,3; 2,3-dimethyl-butadiene-1,3; 1,2-dimethylbutadiene-1,3; piperylene; butadiene-1,3; and the various halogenated derivatives of these compounds. Frequentely it is desired to employ multicomponent systems including a trivinyl compound of this invention, a conjugated diene, and another polymerizable compound such as styrene, acrylonitrile, etc. Elastomeric copolymers, which preferably contain from 0.01% to about 5% of a trivinyl trichlorobenzene monomer are stable in processing, are resistant to solvent attack, etc. The copolymerization of the above compounds can be carried out in a bulk polymerization or in a suitable emulsion medium.

Aromatic and aliphatic compounds having a $CH_2$=C group may be copolymerized with the tri-functional monomers of the invention. Representative compounds of this category are ethylene and substituted derivatives thereof, such as vinyl chloride and vinyl fluoride; olefins such as isobutylene, and isoamylene; vinyl acetate; acrylic acid and esters of acrylic acid, methacrylic acid and its esters; styrene and substituted derivatives thereof, such as p-ethyl styrene, ring substituted chloro-styrenes, (o-chloro-styrene, 2,5-dichlorostyrene, pentachlorostyrene, etc.) methoxystyrene and the like; N-vinyl pyrroles, such as N-vinyl carbazole; vinyl ethers, such as butyl vinyl ether; vinyl thioethers, such as vinyl ethyl thioether; vinyl ketones such as methyl vinyl ketone; vinyl furans; vinyl dibenzofurans; vinyl diphenyl ethers; vinyl diphenyl sulfide; 2-vinyl thiazole and its homologues; vinyl thiophene; vinyl pyridine; vinyl pyrrolidone; allyl acetate and other aliphatic and aromatic allyl compounds and allyl esters.

The trivinyl, trichlorobenzenes of this invention can be incorporated with alkyd resins, dehydrated castor oil, various drying oil compositions, and the like to increase the flame and solvent resistance and otherwise improve the properties of coatings prepared therefrom.

The following examples serve to illustrate the preparation of the symmetrical trivinyl trichlorobenzene, and the prepartion of the various intermediary compounds used in obtaining this final product. It is to be understood that these examples are given by way of illustration only, and are not to be construed as limiting the inventin to the specific steps and products set forth.

EXAMPLE I

*Preparation of symmetrical trichloro triethyl benzene*

90 gms. symmetrical triethyl benzene and 0.55 gm. of iron powder were placed in a 250 cc. 3-neck flask. Chlorine was bubbled through the flask with heat refluxing until there was a gain in weight of 57.3 gms. The flask was maintained at a temperature of 40° C. for approximately the first ⅔ of the reaction and then at 50 to 60° C. for the remaining period. Next air was bubbled through the flask to blow out the hydrochloric acid and chlorine gas dissolved in the product.

The product obtained when the flask was cooled to room temperature was dissolved in benzene. The iron powder was removed by filtration, and the benzene solution was washed with 20% sodium hydroxide twice, dried over magnesium sulfate and then distilled through a heated fractionating column. Resulting fractions and residue were drained and crushed on filter paper to remove oil and then were washed with cold methanol and re-crystallized to obtain the total yield of 81 gms. of the product having a melting point of 62–64.5° C. The calculated analysis of this product was 54.28% carbon, 5.70% hydrogen; the actual analysis was carbon 54.02%, 53.81%, hydrogen 5.88%, 6.01%.

EXAMPLE II

*Preparation of symmetrical alpha bromo trichloro triethyl benzene*

80 gms. of 1–3–5 triethyl 2–3–6 trichlorobenzene was dissolved in 600 cc. of carbon tetrachloride and refluxed in a 2-liter, 2-necked flask fitted with a reflux condenser and dropping funnel. The flask was illuminated from the bottom with a 500 watt unfrosted light bulb, which gave off sufficient heat to cause boiling. 144 gms. of bromine was added dropwise over a period of 8 hrs. during refluxing. The reaction mixture was washed with water, dilute sodium hydroxide, and then dried over magnesium sulfate and filtered. The carbon tetrachloride was removed at a water pump yielding 150 gms. crude product softening at 100° C. and melting at 125–140° C. Re-crystallization of this product gave material of melting point 150 to 156° C. The calculated analysis of this product was 28.68% carbon, 2.41% hydrogen; the actual analysis of the product was 28.57%, 28.40% carbon, 2.62%, 2.51% hydrogen.

EXAMPLE III

*Preparation of symmetrical trivinyl trichlorobenzene*

40 gms. of the crude tribromide product obtained in the above example was refluxed for ½ hr. with 26.8 gms. of potassium hydroxide and 150 cc. of absolute alcohol. At the end of that period the mixture was added to one liter of water and the solid crystals were filtered off. 20 gms. of oily crystals including a large quantity of apparently polymerized materials were obtained. These crystals were then re-crystallized from a 50–50 methanol ether mixture. .6 gms. of insoluble material was filtered off. 5 gms. of the final trivinyl product was obtained having a melting point of from 60–62.5° C. This product was found to contain 55.53, 55.24% carbon; 3.70, 2.87% hydrogen; its calculated analysis was 55.57% carbon, 3.49% hydrogen.

Various polymers of this symmetrical trivinyl product were then produced by polymerization in an oven held at 100° C. Results of these polymerization trials are best seen with reference to the following table which gives the compositions which were polymerized, and various comments concerning the polymers.

compounds, chlorinated diphenyl, high boiling aliphatic hydrocarbons, and liquid or rubbery polymers of alefins, diolefins, etc. The plasticizers can be added to the monomeric material prior to polymerization or may be incorporated into the polymers by milling, solvent action, etc., depending upon the extent of cross-linking.

One particular application for the monomers of the invention is in the field of polymerizable casting and impregnating materials. For example, styrene-trivinyl trichlorobenzene mixtures, in a ratio of 100:1 to 1:1 can be used to impregnate electrical capacitors containing porous dielectric spacing materials, followed by polymerization in situ. Such materials can also be used for potting coils, transformers, printed circuits, capacitors, etc., and as polymerizable end seal materials. The high frequency losses of such copolymers are very low making them suitable for R. F., H. F. and V. H. F. applications. For optimum electrical characteristics, the symmetrical trivinyl trichlorobenzene is employed.

One important use of the new resins developed in accordance with this invention is in the formation of resins used as an intermediate in the preparation of various ion exchange resins. Trivinyl trichlorobenzene can be bead polymerized with styrene to give a polymer which can be converted to an ion-exchange resin by sulfonation, or nitration with reduction of the nitro groups to amino groups.

As many apparently widely different embodiments of this invention may be made without departing from the spirit and scope hereof, it is to be understood that the invention is not limited to the specific embodiments hereof, except as defined in the appended claims.

I claim:
1. Symmetrical trivinyl trichlorobenzene.

POLYMERIZATION TABLE

| Sample | Time at 100° C. | | | |
|---|---|---|---|---|
| | 1 Hr. | 2½ Hrs. | 6 Hrs. | Overnight at 110° C. |
| 1. .25 g. TTB [1] | Lqd | Solid | | pale yellow brittle resin. |
| 2. .25 g. TTB Trace benzoyl peroxide. | Solid | do | | Do. |
| 3. .01 g. TTB, .99 g. styrene | Lqd | Viscous | No Longer Flows. | tough, clear, some popcorn. |
| 4. .25 g. TTB | Lqd | Solid | | tough, clear, resin. |
| 5. .40 TTB, .10 styrene | Lqd | do | | Do. |
| 6. .01 TTB, .99 PCS [2] | Crystalline | | | milky resin. |
| 7. .25 TTB, .25 PCS | Viscous | Solid | | pale yellow, clear brittle resin. |
| 8. .01 TTB, .99 VC [3] | Polymer and Liquid Layer. | do | | reddish, clear brittle resin. |

[1] TTB means symmetrical trivinyl trichlorobenzene.
[2] PCS means pentachlorostyrene.
[3] VC means N-vinyl carbazole.

In addition a trivinyl trichloro benzene-styrene in a 50:50 ratio were also polymerized for 1½ hrs. at 65° C. A pale yellow product infusible at 300° C. was obtained.

Homo-polymers of this invention are substantially non-flammable because of their high chlorine content. Co-polymers, containing reasonable gross chlorine content also will not sustain flame. They are capable of withstanding high electrical field strengths and/or heat, and are therefore particularly advantageous for electrical purposes. The monomeric trivinyl compounds of this invention are of particular utility for the formation of various polymers and copolymers in which they may be employed in any proportion. They form particularly advantageous polymers with from about 50% to about 99.9% of styrene. In addition they are useful as chemical intermediates.

Plasticizers can be incorporated in many of the polymers of this invention in order to increase their flexibility and/or toughness. Some of these plasticizers are the various phthalic acid esters, the hydrogenated polyaryl 2. A homo-polymer of symmetrical trivinyl trichlorobenzene.
3. A co-polymer of symmetrical trivinyl trichlorobenzene with at least one polymerizable vinyl compound.
4. A co-polymer of symmetrical trivinyl trichlorobenzene with styrene.
5. A co-polymer of symmetrical trivinyl trichlorobenzene with from about 50% to about 99.9% styrene.
6. A polymer of symmetrical trivinyl trichlorobenzene.

References Cited in the file of this patent

UNITED STATES PATENTS

| Number | Name | Date |
|---|---|---|
| 2,528,445 | Markarian | Oct. 31, 1950 |
| 2,602,823 | Ross et al. | July 8, 1952 |

OTHER REFERENCES

Mowry et al., Journ. Amer. Chem. Soc., vol. 22, May 1950, pages 2037 and 2038.